Patented May 1, 1951

2,551,449

UNITED STATES PATENT OFFICE 2,551,449

METHOD FOR LOCATING DEPOSITS

John R. Menke, New York, N. Y., assignor to Nuclear Development Associates, Inc., New York, N. Y.

No Drawing. Application June 15, 1949,
Serial No. 99,370

5 Claims. (Cl. 250—83.6)

This invention is concerned with a method for locating and evaluating hidden deposits. The method provides a useful addition to methods already proposed for prospecting and mining and similar investigations.

Earlier methods

It has previously been proposed that the location of radioactive materials may be aided by using instruments measuring radiation to detect energetic nuclear particles (usually alpha and beta particles) and radiation (usually gamma rays) associated with the radioactive materials. One disadvantage of this geophysical method lies in the masking effect of relatively valueless radioactive materials like the radioactive isotope of the widespread element, potassium. Detailed analysis of the radiation is required to distinguish between valuable and valueless deposits by radiation methods alone. Another disadvantage lies in the relatively short range for detection of these energetic nuclear particles and radiation. Their energy, which is used for their detection, is rapidly absorbed in their passage through relatively small amounts of matter.

Other methods which have been proposed are geochemical methods for finding valuable deposits by analyzing soil gases, liquids and solids for constituents characteristic of the valuable deposits. It has also been proposed to modify these methods by measuring the ratios of concentrations of different elements or compounds obtained at various locations, correction being made for the local effects of the surface. This modification, however, is difficult to apply, requiring ratio analyses for different elements or compounds with difficult interpretation problems due, for instance, to the widely different properties of the elements or compounds which are important in diffusing or traveling in other manners from the source.

Present method

My invention consists of an improved geochemical and geophysical method for location of valuable deposits, or determination of important characteristics thereof, or both, by detection of, or measurement of concentration of, a selected element or chemical compound present in samples of solid, liquid or gas collected in a region, said element or compound being indicative of the deposit being investigated, together with measurement of the relative abundance of isotopes of the element, or an element of the compound, and recording said measurements in correlation with the spatial relation of the points of sampling, thus obtaining a record of useful information as to the source of the element and as to other materials in the vicinity of the source. In some cases it is advantageous to determine the relative abundances of isotopes of more than one element in the sample. In other cases it is advantageous to measure the relative abundance of isotopically differing species of a compound or ion by virtue of their different molecular weights. In general, it is advantageous to analyze samples taken at points which are either laterally spaced in an area or at different depths, or both, in a systematic manner throughout a region and to record the analytical data in correlation with the places of sampling, thus determining significant anomalies indicative of the hidden deposit. Thus, the method may be applied both to areal prospecting, at and near the surface, and to drill-hole logging. The useful information secured from geochemical prospecting, together with determination of the relative abundances of isotopes, may consist of such indications as the source identity or concentration, or both, in addition to the source location and extent. It may also include indications of the location, identity, concentration and extent of associated materials whereby the economic importance of the deposit may be evaluated. It will be clear that my method is useful not only for locating hidden deposits but also for locating and evaluating them or merely for evaluating them. I use the term prospecting to include these several aspects.

Dependent upon their form and the local geology, the analyzed elements or compounds will travel from their source by diffusion and gas flow processes (as, for instance, helium) or by other geologic processes (such as circulating ground waters carrying soluble material). It is clear that the method of detection and isotopic analysis of elements in the form of gases, liquids or solids has utility and that the method for any combination of forms also has utility. The particular geology and occurrences in a specific geographic region will determine the most useful step or combination of steps.

Method applied to uranium prospecting

An important specific example which will serve to illustrate my invention is the discovery of uranium deposits. Uranium and its decay products are radioactive; they can be located within a short range today in accordance with previous proposals by their energetic alpha and beta particles and gamma rays but, as mentioned before, field identification by ionization is complicated, for instance, by the relatively abundant and widespread radioactive potassium. In accordance with other proposals uranium may be located by measuring ratios of elements such as radon/helium but with attendant interpretation difficulties. However, by the method of my invention uranium deposits may be located and investigated without these attendant difficulties.

I propose that in the region to be explored, samples be taken in a systematic manner, that the presence or concentration of helium and the ratio of isotopes helium three and helium four be determined for each sample. These steps are taken after the initial helium particle energy is spent and after it has lost its ionization. Radioactive potassium does not emit an alpha particle, and thus causes no confusion. Furthermore, only a single element, helium, is examined, simplifying interpretation of the diffusion paths. The mass three helium atoms detected in the isotopic analysis are largely products of complex nuclear reactions among the energetic (mass four) alpha particles of the uranium (and its decay products) and other elements, especially lithium, and tritium and the neutrons in the vicinity. A relatively low ratio of mass three to mass four helium would indicate a relatively high concentration of uranium in the source. The analytical data should then be correlated with the places of sampling to investigate the region.

My invention is similarly useful for thorium deposits.

The utility of my invention may be more fully appreciated by considering a typical case of nuclear reaction in the vicinity of radioactive material such as uranium and thorium. I have chosen for this illustration a case where helium and its isotopic constitution carry the source information.

It is reasonable to assume that a major fraction, perhaps all, of the earth's helium is radiogenic. Thus the largest part of the helium in the vicinity of uranium and thorium deposits is due to the energetic alpha particles released along the respective disintegration chains. Most of these energetic alpha particles escape nuclear reactions which destroy their identity as helium nuclei, then quickly lose their initial kinetic energy and ionization, and exist thereafter as helium atoms of mass four.

*Typical nuclear reactions in the earth producing $He^4$*

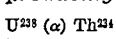

$He^4$

A small fraction of the energetic alpha particles enter into nuclear reactions with the more stable materials surrounding the radioactive species. Some of these reactions result in alpha-neutron processes which liberate neutrons in the vicinity.

*Typical nuclear reactions in the earth producing $He^3$*

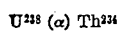
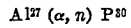
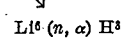
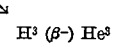

$He^3$

The range of these neutrons is much greater than that of the alpha particles in the ground. These neutrons with their greater range in the earth are important to this example of the method namely, to prospecting for uranium. The role of the neutrons is as follows: they are either absorbed in the local uranium or in the more stable surrounding materials. Among the surrounding materials there is usually, for instance, some of the relatively abundant element, lithium, whose isotope, lithium of mass six, undergoes a neutron-alpha reaction leaving tritium, hydrogen of mass three, as another product. This tritium is unstable and decays to helium of mass three. (A similar end, resulting in the production of some helium of mass three, may also take place with, for instance, nitrogen or boron among the surrounding materials.) This competition for the alpha particles and for the neutrons produces, dependent upon the local composition, various ratios of helium of mass three and helium of mass four which isotopic ratios are measured. Thus, large amounts of uranium in the vicinity constitute a sink for the neutrons which sink does not produce helium of mass three. Since fewer neutrons will enter into reactions producing helium of mass three, the ratio in the vicinity will be low in this helium isotope and will indicate the uranium sink. (Conversely, a high anomaly in the ratio indicates local deposits rich in lithium or beryllium.) An example of results in a particular calculated case is given in the table. (For the particular example given in the table, the uranium was assumed to be dispersed, (1) in ore aggregations with dimensions small compared to the alpha particle range and (2) in average-earth-crust composition gangue except for the uranium concentration. The uranium concentration was arbitrarily varied as shown.)

TABLE

| Uranium (weight fraction in ore) | | $He^3/He^4$ (volumetric ratio) |
|---|---|---|
| $3 \times 10^{-7}$ | | $2.0 \times 10^{-7}$ |
| $3 \times 10^{-6}$ | Approximate normal distribution in earth's crust. | $2.0 \times 10^{-7}$ |
| $3 \times 10^{-5}$ | | $2.0 \times 10^{-7}$ |
| $3 \times 10^{-4}$ | | $2.0 \times 10^{-7}$ |
| $3 \times 10^{-3}$ | | $1.8 \times 10^{-7}$ |
| $3 \times 10^{-2}$ | This concentration begins to be economic. | $1.04 \times 10^{-7}$ |
| $15 \times 10^{-2}$ | | $0.31 \times 10^{-7}$ |
| $27 \times 10^{-2}$ | | $0.015 \times 10^{-7}$ |

The pattern of variation of the isotopic ratio with uranium concentration in this example is perhaps more significant to note than the particular values of the ratio itself. Typical isotopic ratio results are relatively independent of the concentration of helium in any vicinity not masked by atmospheric helium, but depend strongly upon the uranium concentration near the helium source. Moreover, the index becomes sensitive just about at the economic point of interest. In some cases, measurement of the relative concentration of the element, helium, at different points together with isotopic ratio measurements will give more useful information. Similar results apply to thorium.

There are other valuable materials, such as silver, gold and tungsten, which can exist within the range of the neutrons and constitute sinks for the neutrons. Many other useful minerals are also strong sinks for neutrons when compared to average rock constituents. Except for lithium, few involve reactions with neutrons which result in helium of mass three. A low anomaly in the abundance of helium of mass three may also indicate these materials, especially where the concentration of the element, helium, is also low.

Thus my method of exploration with measurement of isotopic abundances may serve to find other materials even when local uranium or thorium concentrations may be uneconomic and serve only as neutron sources. The uranium or thorium and resultant neutrons are, so to speak, employed as a local probe and the helium (in this example) together with its isotopic constitution is employed as a traveling indicator.

Some of the neutrons in the region of radioactive materials may be absorbed by chlorine in the vicinity, giving rise, for instance, to chlorine of mass thirty-six. This chlorine of mass thirty-six is radioactive with a very long half-life, and is relatively rare in chlorine of normal isotopic constitution. Thus a high anomaly in the abundance of chlorine of mass thirty-six indicates a radioactive deposit and chlorine may be used as a traveling indicator in a manner similar to that for helium.

Method applied to gold prospecting

Gold enters into chemical solutions reluctantly and therefore rarely serves as a traveling indicator for the presence of gold deposits. However, gold which exists in the vicinity of radioactive materials (uranium and thorium are ubiquitous in igneous, especially acidic, rock) will be subject to a neutron field. The neutrons are largely caused by the alpha-neutron reactions mentioned earlier. Part of the gold is transmuted into mercury which does enter into chemical combinations and can travel from its site of formation. This transmuted mercury will be wholly composed of the mercury isotope of mass one hundred ninety-eight which is distinguishable from ordinary mercury (containing only about ten per cent of this isotope) by measurement of isotopic abundances. Thus again the method of my invention may serve to find valuable deposits by the steps of geochemical propecting augmented with measurement of isotopic abundances. In this example it is, of course, necessary that the small amounts of mercury formed from gold not be masked by very much larger amounts of native, ordinary mercury.

Method applied to other deposits

I have described examples of my invention for finding radiocative and precious metal deposits. The particular examples given employed helium, chlorine and mercury as traveling indicators. They serve to illustrate the application of my more general invention for finding valuable deposits. My method of locating valuable deposits is not limited to radiocative materials such as uranium and thorium and to precious metals such as gold. Thus vanadium is associated with uranium as carnotite in extensive areas, and my method serves to locate this type of vanadium. Furthermore, my method is also useful in the location of minerals in the vicinity not necessarily chemically combined with the radioactive species as is the case with uranium in carnotite and the rare earth elements with thorium in monazite. Thus the method has utility in the finding of lithium, beryllium, rubidium and cesium, and other minerals and deposits.

Specific means and apparatus

My invention is not limited to any particular methods or apparatus for detection, concentration determination, or measurement of relative isotopic abundances nor to any particular method or means for collecting samples. Therefore, I have not heretofore illustrated or described any specific detection, analytical, isotopic analysis or sample collection methods or apparatus. They are well known to those skilled in the art. For instance, measurement of the relative abundances of isotopes may be carried out by means of the mass spectrometer which is suited to almost all cases; and by means of radiation analysis which is suited to chlorine thirty-six isotopic analysis, mentioned earlier. The steps of detection or measurement of concentration and of isotopic analysis can be performed simultaneously or in any order. The literature is replete with descriptions of methods and apparatus for detecting the presence of and for measuring the concentration of the various elements and compounds and for collecting samples to be used in geochemical prospecting. It is clear that the relative isotopic abundances of an element or compound may be measured with the samples ionized (as is usually done in the mass spectrometer). I use the terms element and compound to include their ionized forms and the ion-fragments of compounds.

I will describe two unusual specific steps, however. First, the analytical method of neutron activation is peculiarly suited to the measurement of relative abundance of the isotopes of helium. And, second, in taking a helium sample for concentration analysis or for the mass spectrometer or for neutron activation analysis it is frequently convenient to pass the helium through a hot quartz or glass wall by diffusion without making any overt opening into an apparatus' gas system. Other gases, except perhaps hydrogen, are effectively hindered by this diffusion barrier. The technique is rather similar to that of separating hydrogen alone by causing its diffusion through hot platinum or palladium walls and possesses many similar advantages. It is perhaps unnecessary to caution those skilled in the art against contamination of helium samples by ordinary atmospheric helium in the sampling step or in subsequent steps.

What I claim and desire to secure by Letters Patent of the United States is:

1. The method of geochemical and geophysical prospecting for subterranean deposits including the steps of procuring samples from the earth at different points in a predetermined region, detecting in each sample the presence of at least one selected element indicative of the hidden deposit, measuring in each sample the relative abundance of the isotopes of said selected element, and recording said measurements of relative abundances in correlation with the spatial relation of the points of sampling to determine significant anomalies indicative of the hidden deposits.

2. The method according to claim 1 in which the selected element is helium.

3. The method of geochemical and geophysical prospecting for subterraneon deposits including the steps of procuring samples from the earth at different points in a predetermined region, detecting in each sample the presence of at least one selected chemical compound indicative of the hidden deposit, measuring in each sample the relative abundance of the isotopically different species of said selected chemical compound, and recording said measurements of relative abundances in correlation with the spatial relation of the points of sampling so as to determine significant anomalies indicative of the hidden deposits.

4. The method according to claim 3 in which the selected chemical compound is a chlorine compound and the selected element is chlorine.

5. The method according to claim 3 in which the selected chemical compound is a mercury compound and the selected element is mercury.

JOHN R. MENKE.

REFERENCES CITED

The following references are of record in the file of this patent:

"Atomic Physics," University of Pittsburgh Staff, publ. by John Wiley & Sons, Inc., New York, 1937, pp. 280–282.

"Nature," Jan. 12, 1935, vol. 135, page 65.

"Measurement of Relative Abundance with the Mass Spectrometer," Journal of Applied Physics, vol. 13, Sept. 1942, p. 539.